United States Patent [19]
Harton et al.

[11] Patent Number: 5,450,927
[45] Date of Patent: Sep. 19, 1995

[54] WOODSMEN PORTABLE SEAT

[76] Inventors: Jeremy L. Harton; Kathryn B. Harton, both of 3401 Bellevue Hwy., Olivet, Mich. 49076

[21] Appl. No.: 337,087

[22] Filed: Nov. 10, 1994

[51] Int. Cl.6 .......................................... A01M 31/02
[52] U.S. Cl. .................................... 182/187; 182/188
[58] Field of Search ...................... 182/187, 188, 116; 108/152

[56] References Cited

U.S. PATENT DOCUMENTS

| | | | |
|---|---|---|---|
| 3,358,789 | 12/1967 | Laun | 182/187 X |
| 4,721,183 | 1/1988 | Koniecka | 182/187 |
| 4,727,961 | 3/1988 | Dawson | 182/187 |
| 5,105,910 | 4/1992 | Engstrom | 182/187 |
| 5,131,496 | 7/1992 | White | 182/187 |

Primary Examiner—Alvin C. Chin-Shue

[57] ABSTRACT

It is an object of the present invention to provide a new and improved portable seat for use in the outdoors comprising an elongated lower support member having a first end, a second end, a top surface, and a bottom surface. A triangular securement member has an upper portion, a lower portion, a base end and an apex end, the apex end of the securement member being integral with the first end of the lower support member. The upper portion of the securement member includes a first leg and a second leg, and a slot formed within the base end of the securement member. An elongated upper support has a first end and a second end, a top surface and a bottom surface. A back rest has a first end, a second end, a top surface and a bottom surface, the top surface of the back rest being secured to the second end bottom surface of upper support. A connecting element has a first end, a second end, a top surface and a bottom surface, the second end of the connecting element being integral with the first end of the upper support, the first end of the connecting element pivotally connected in between the first and second legs of the triangular securement member. A circular seat has a top surface and a bottom surface, the bottom surface of circular seat being rotatably connected to the top surface of the lower support. A strap has a first end and a second end and an intermediate extent therebetween, the intermediate extent of the strap extending through the slot of the securement member, the strap functioning to secure the portable seat to a tree.

4 Claims, 4 Drawing Sheets

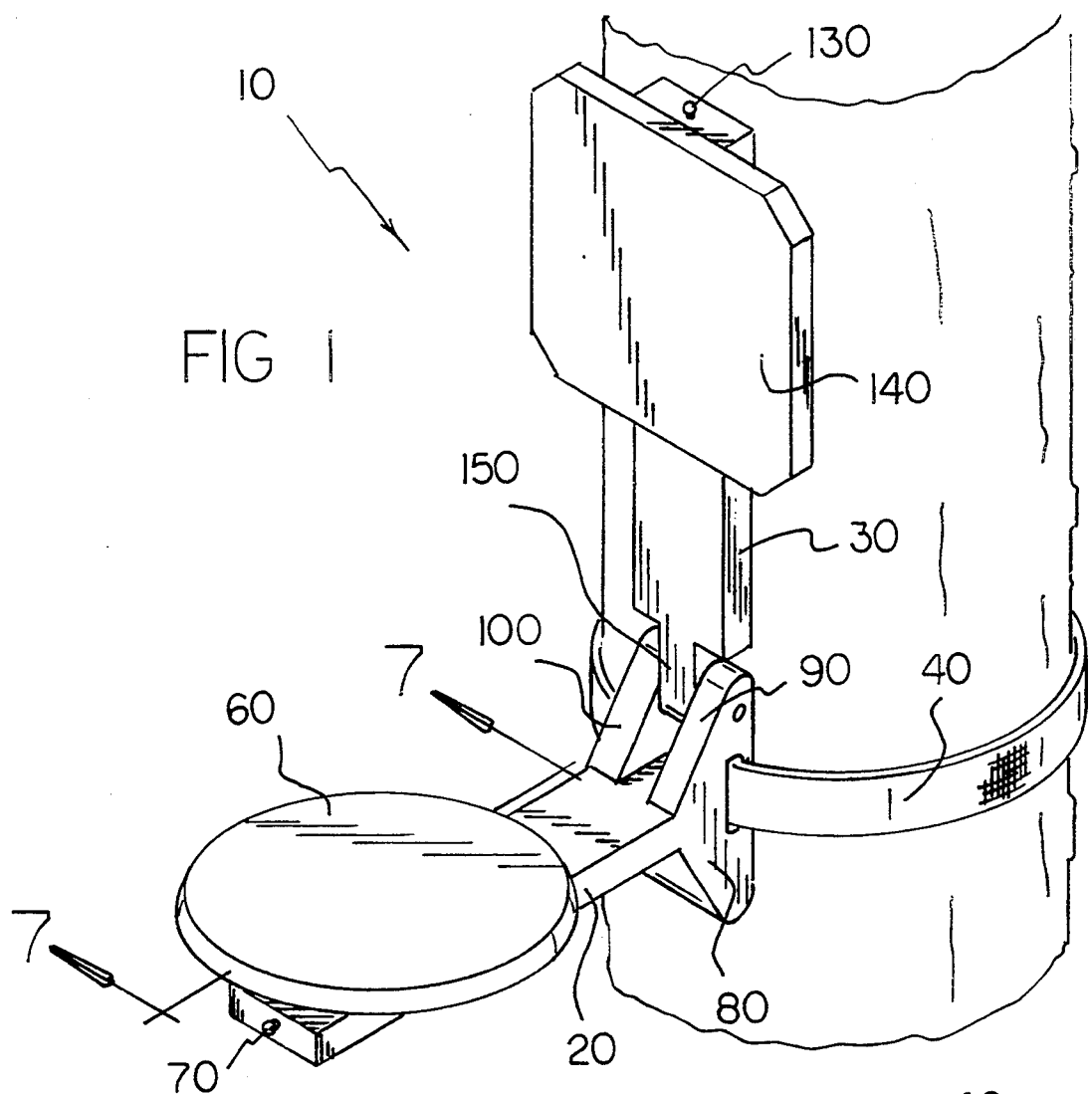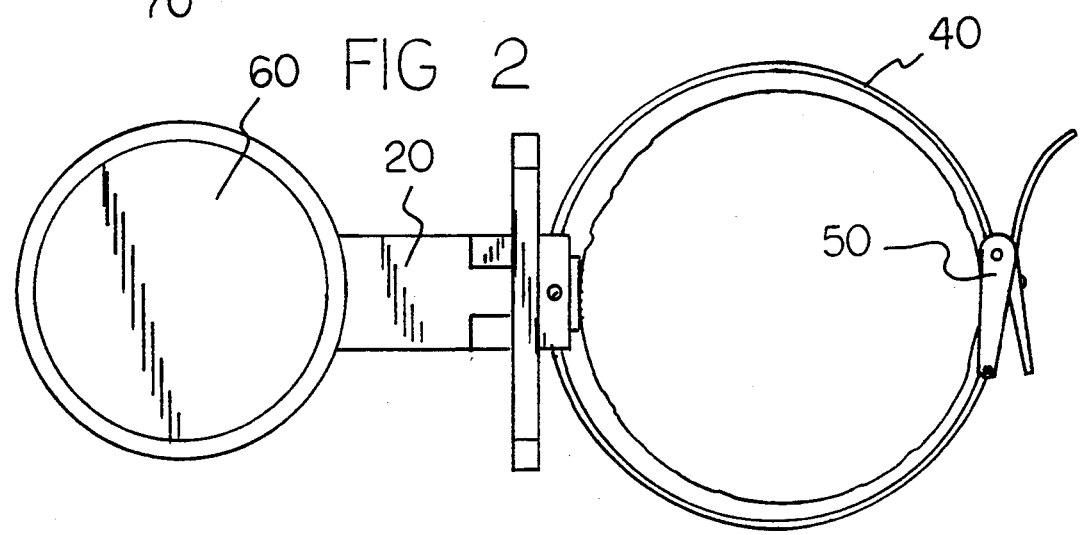

WOODSMEN PORTABLE SEAT

BACKGROUND OF THE INVENTION

1. Field of the Invention

The present invention relates to a woodsmen portable seat and more particularly pertains to a portable tree stand with a rotating seat.

2. Description of the Prior Art

The use of tree stands is known in the prior art. More specifically, tree stands heretofore devised and utilized for the purpose of hunting are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,552,246 to Thomas a portable hunter tree stand.

U.S. Pat. No. 4,995,475 to Berkbuegler discloses a hunter's portable tree stand.

U.S. Design Pat. No. 270,474 to Haines et. al. discloses a tree stand for hunters.

U.S. Pat. No. 5,105,910 to Engstrom discloses a portable tree stand for hunters.

Lastly, U.S. Pat. No. 5,195,611 to Untz discloses a portable observation and hunting stand.

In this respect, the woodsmen portable seat according to the present invention substantially departs from the conventional concepts and designs of the prior art, and in doing so provides an apparatus primarily developed for the purpose of giving people a convenient and portable outdoor seat.

Therefore, it can be appreciated that there exists a continuing need for a new and improved woodsmen portable seat which can be used for giving people a convenient and portable outdoor seat. In this regard, the present invention substantially fulfills this need.

SUMMARY OF THE INVENTION

In view of the foregoing disadvantages inherent in the known types of tree stands now present in the prior art, the present invention provides an improved woodsmen portable seat. As such, the general purpose of the present invention, which will be described subsequently in greater detail, is to provide a new and improved woodsmen portable seat and method which has all the advantages of the prior art and none of the disadvantages.

To attain this, the present invention essentially comprises a lower support member pivotally secured to an upper support member. The lower support member is a adapted to be secured about a tree by way of a strap and a ratchet mechanism. Furthermore, a seat is secured to the lower support member by a swivel assembly. More specifically, the elongated lower support member has a first end, a second end, a top surface, and a bottom surface, and an aperture formed through the second end of the lower support. Additionally, a male member is secured to the second end of the lower support member. Integral with the lower support member is a triangular securement member. The triangular securement member has an upper portion, a lower portion, a base end and an apex end, with the apex end of the securement member being integral with the first end of the lower support member. The upper portion of the securement member includes a first leg and a second leg. A slot is formed within the base end of the securement member. Furthermore, a first aperture is formed within the first leg of the upper portion, and a second aperture is formed within the second leg of the upper portion. Likewise, the elongated upper support includes a first end and a second end, a top surface and a bottom surface. The upper support also includes a number of male members: a first male member secured to the upper surface; a second male member secured to the upper surface; and a male member secured to the second end of the upper support. The portable seat also includes a back rest which has a first end, a second end, a top surface and a bottom surface. The top surface of the back rest is secured to the second end bottom surface of upper support. A connecting element serves to connect the upper support with a lower support. The connecting element includes a first end, a second end, a top surface and a bottom surface, with the second end of the connecting element being integral with the first end of the upper support. An aperture is formed through the first end of the connecting element. The first end of the connecting element is positioned in between the first and second legs of the triangular securement member. A pin is positioned within the first aperture of the first leg, the aperture of the connecting element, and the aperture of the second leg with the pin functioning to pivotally secure the upper support to securement member. A swiveling connection assembly serves to interconnect the lower support to the seat. The assembly includes: a first plate member, the first plate member having a centrally located aperture, a top surface and a bottom surface; and a second plate member, the second plate member having a centrally located aperture, a top surface and a bottom surface; a bolt secured through the centrally located aperture of the first plate member, the centrally located aperture of the second plate member, and the aperture of the lower support member. The bolt is such that it allows for the first plate member to be rotated relative to the second plate member. The circular seat has a top surface and a bottom surface, with the bottom surface of the seat being secured to the top surface of the first plate member. Thus, the swivelling connection assembly allows for the seat to rotate relative to the lower support member. Thus, the seat is rotatably connected to the lower support. A strap serves to secure the lower support to a tree trunk. The strap has a first end and a second end and an intermediate extent therebetween. The intermediate extent of the strap extends through the slot of the securement member. A ratchet assembly allows the strap to be easily adjusted about a tree. The ratchet assembly has a first leg and a second leg, with the first leg being pivotally secured to the second leg. The first end of the strap is secured to the first leg of the ratchet assembly, and the second end of the strap is secured to the second leg of the ratchet assembly. The ratchet assembly functions such that when the first leg is pivoted relative to the second leg a length of strap is wound within the second leg. A first strap segment serves to hold the lower support to the upper support when the seat is in its collapsed orientation. The first strap segment has a first end and a second end, with an aperture formed within the first end, and an aperture formed within the second end. The aperture of the first end is adapted to be secured to the male member of the second end of the upper support, and the aperture of the second end is adapted to be secured to the male member of second end of the lower support. The second strap segment serves as the carrying handle for the seat in its collapsed orientation. The second strap has a first end and a second end, and an aperture formed within the first end, an aperture formed within the second end. The aperture of the first end is adapted to be secured to the first male member of the upper support, and the aperture of the second end is adapted to be secured to the second male member of the upper support. As such the second strap member functions as the handle for the portable seat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved woodsmen portable seat which has all the advantages of the prior art tree stands and none of the disadvantages.

It is another object of the present invention to provide a new and improved woodsmen portable seat which may be easily and efficiently manufactured and marketed.

It is a further object of the present invention to provide a new and improved woodsmen portable seat which is of durable and reliable constructions.

An even further object of the present invention is to provide a new and improved woodsmen portable seat which is susceptible of a low cost of manufacture with regard to both materials and labor, and which accordingly is then susceptible of low prices of sale to the consuming public, thereby making such woodsmen portable seat economically available to the buying public.

Still yet another object of the present invention is to provide a new and improved woodsmen portable seat which provides in the apparatuses and methods of the prior art some of the advantages thereof, while simultaneously overcoming some of the disadvantages normally associated therewith.

Even still another object of the present invention is to give people a convenient and portable outdoor seat.

Lastly, it is an object of the present invention to provide a new and improved portable seat for use in the outdoors comprising an elongated lower support member having a first end, a second end, a top surface, and a bottom surface. A triangular securement member has an upper portion, a lower portion, a base end and an apex end, the apex end of the securement member being integral with the first end of the lower support member. The upper portion of the securement member includes a first leg and a second leg, and a slot formed within the base end of the securement member. An elongated upper support has a first end and a second end, a top surface and a bottom surface. A back rest has a first end, a second end, a top surface and a bottom surface, the top surface of the back rest being secured to the second end bottom surface of upper support. A connecting element has a first end, a second end, a top surface and a bottom surface, the second end of the connecting element being integral with the first end of the upper support, the first end of the connecting element pivotally connected in between the first and second legs of the triangular securement member. A circular seat has a top surface and a bottom surface, the bottom surface of circular seat being rotatably connected to the top surface of the lower support. A strap has a first end and a second end and an intermediate extent therebetween, the intermediate extent of the strap extending through the slot of the securement member, the strap functioning to secure the portable seat to a tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the woodsmen portable seat constructed in accordance with the principles of the present invention.

FIG. 2 is a plan view of the seat of FIG. 1.

The same reference numerals refer to the same parts through the various Figures.

DESCRIPTION OF THE PREFERRED EMBODIMENT

Figure 3:
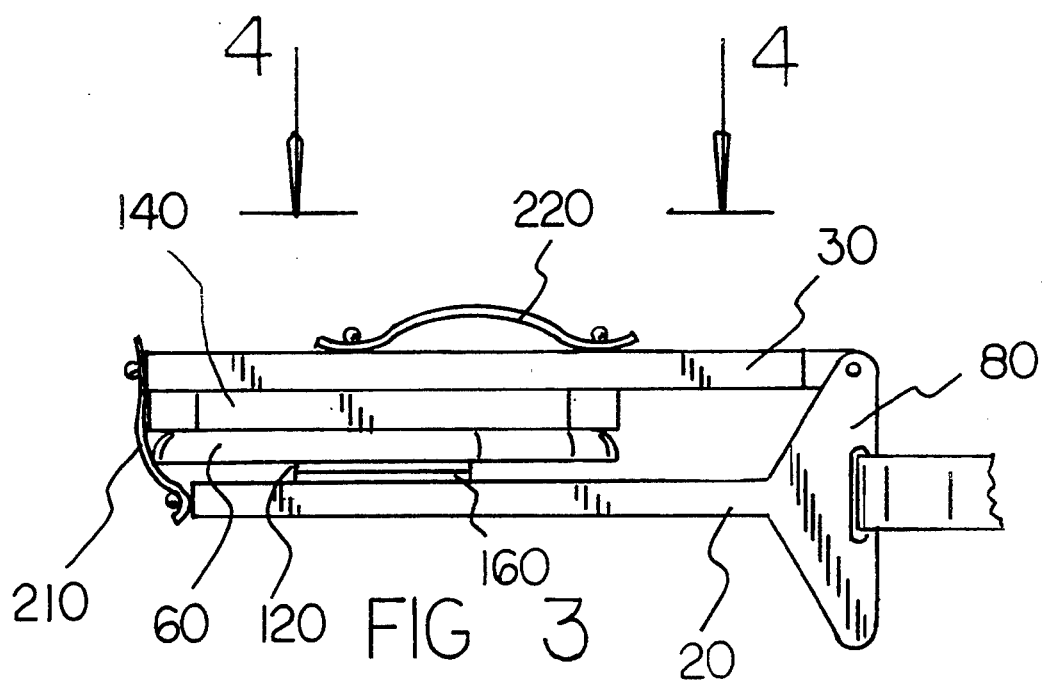
FIG. 3 is a side elevational view of the seat of FIG. 1.
Figure 4:
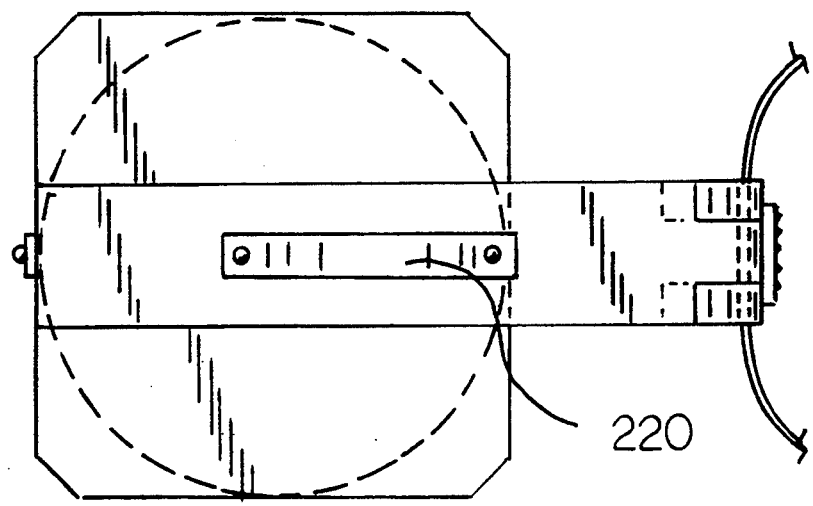
FIG. 4 is a view taken along 4—4 of FIG. 3.
Figure 5:
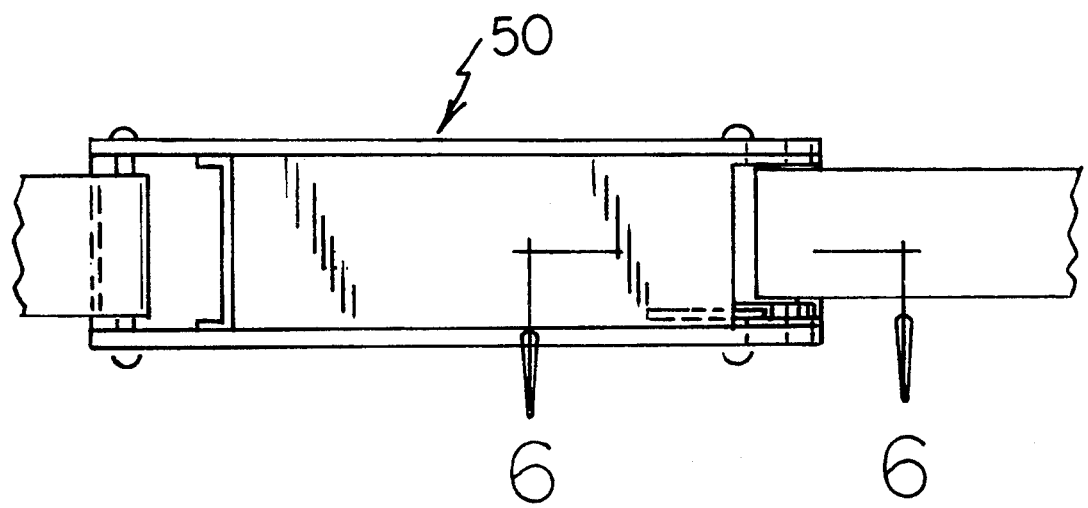
FIG. 5 is a view of the ratchet assembly of the present invention.
Figure 6:
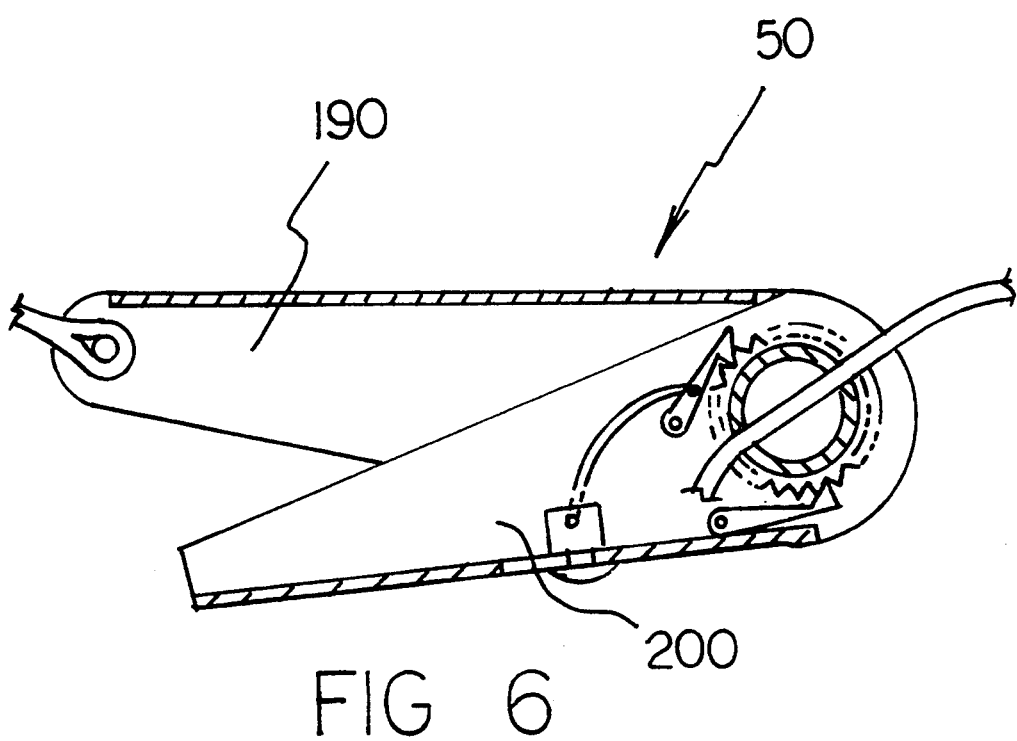
FIG. 6 is a view taken along line 6—6 of FIG. 5.
Figure 7:
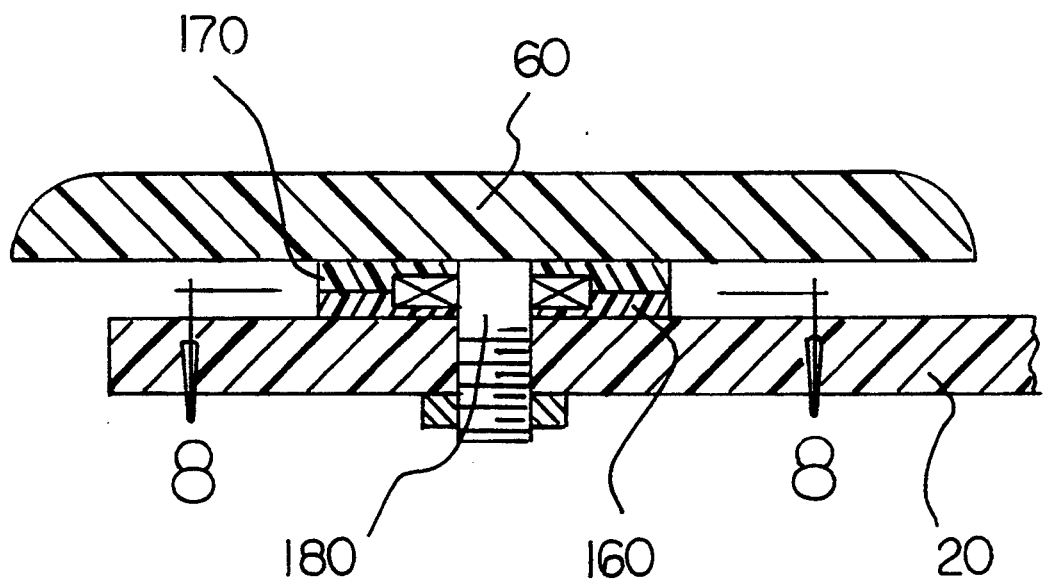
FIG. 7 is a view of the swivel assembly of the present invention.
Figure 8:
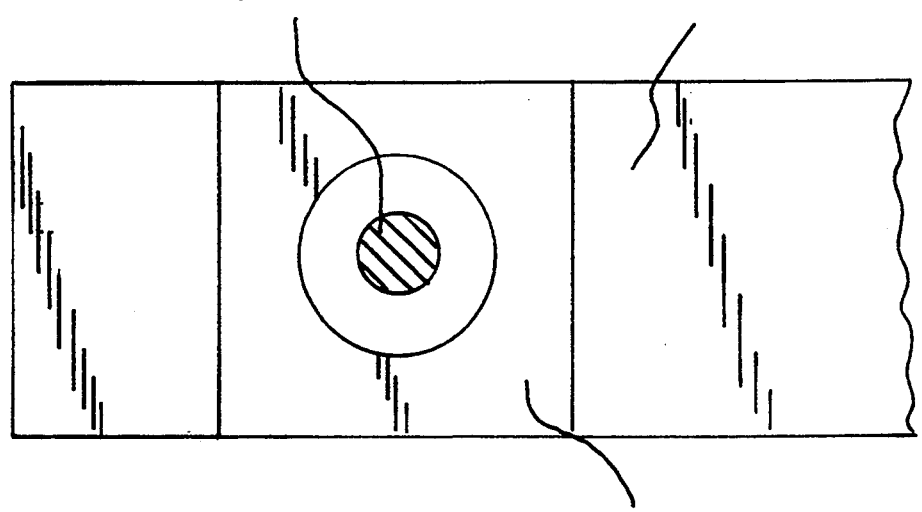
FIG. 8 is a view taken along line 8—8 of FIG. 7.

With reference now to the drawings, and in particular to FIG. 1 thereof, the preferred embodiment of the new and improved woodsmen portable seat embodying the principles and concepts of the present invention and generally designated by the reference numeral 10 will be described.

More specifically, it will be noted in the various Figures that the invention, in its broadest context, includes a lower support member 20 pivotally secured to an upper support member 30. The lower support member 20 is a adapted to be secured about a tree by way of a strap 40 and a ratchet mechanism 50. Furthermore, a seat 60 is secured to the lower support member 20 by a swivel assembly.

More specifically, the elongate lower support member 20 has a first end, a second end, a top surface, and a bottom surface, and an aperture formed through the second end of the lower support 20. Additionally, a male member 70 is secured to the second end of the lower support member 20. Integral with the lower support member 20 is a triangular securement member 80. The triangular securement member 80 has an upper portion, a lower portion, a base end and an apex end, with the apex end of the securement member being integral with the first end of the lower support member 20. The upper portion of the securement member includes a first leg 90 and a second leg 100. A slot is formed within the base end of the securement member. Furthermore, a first aperture is formed within the first leg of the upper portion, and a second aperture is formed within the second leg of the upper portion.

Likewise, the elongate upper support 30 includes a first end and a second end, a top surface and a bottom surface. The upper support also includes a number of male members: a first male member 110 secured to the upper surface; a second male member 120 secured to the upper surface; and a male member 130 secured to the second end of the upper support.

The portable seat 10 also includes a back rest 140 which has a first end, a second end, a top surface and a bottom surface. The top surface of the back rest is secured to the second end bottom surface of upper support 30.

A connecting element 150 serves to connect the upper support with a lower support. The connecting element 150 includes a first end, a second end, a top surface and a bottom surface, with the second end of the connecting element 150 being integral with the first end of the upper support 30. An aperture is formed through the first end of the connecting element. The first end of the connecting element is positioned in between the first 90 and second 100 legs of the triangular securement member 80. A pin is positioned within the first aperture of the first leg, the aperture of the connecting element, and the aperture of the second leg with the pin functioning to pivotally secure the upper support 30 to securement member 80.

A swiveling connection assembly serves to interconnect the lower support 20 to the seat 60. The assembly includes: a first plate member 160, the first plate member 160 having a centrally located aperture, a top surface and a bottom surface; and a second plate member 170, the second plate 170 member having a centrally located aperture, a top surface and a bottom surface; a bolt 180 secured through the centrally located aperture of the first plate member 160, the centrally located aperture of the second plate member 170, and the aperture of the lower support member 20. The bolt 180 is such that it allows for the first plate member 160 to be rotated relative to the second plate member 170.

The circular seat 60 has a top surface and a bottom surface, with the bottom surface of the seat being secured to the top surface of the first plate member 160. Thus, the swivelling connection assembly allows for the seat 60 to rotate relative to the lower support member 20. Thus, the seat 60 is rotatably connected to the lower support 20.

A strap 40 serves to secure the lower support 20 to a tree trunk. The strap 40 has a first end and a second end and an intermediate extent therebetween. The intermediate extent of the strap extends through the slot of the securement member 80.

A ratchet assembly 50 allows the strap 40 to be easily adjusted about a tree. The ratchet 50 assembly has a first leg 190 and a second leg 200, with the first leg 190 being pivotally secured to the second leg 200. The first end of the strap 40 is secured to the first leg 190 of the ratchet 50 assembly, and the second end of the strap 40 is secured to the second leg 200 of the ratchet 50 assembly. The ratchet 50 assembly functions such that when the first leg 190 is pivoted relative to the second leg 200 a length of strap 40 is wound within the second leg 200.

A first strap 210 segment serves to hold the lower support to the upper support when the seat is in its collapsed orientation. The first strap segment 210 has a first end and a second end, with an aperture formed within the first end, and an aperture formed within the second end. The aperture of the first end is adapted to be secured to the male member 130 of the second end of the upper support, and the aperture of the second end is adapted to be secured to the male member 70 of second end of the lower support.

The second strap 220 segment serves as the carrying handle for the seat in its collapsed orientation. The second strap has a first end and a second end, and an aperture formed within the first end, an aperture formed within the second end. The aperture of the first end is adapted to be secured to the first male member 110 of the upper support, and the aperture of the second end is adapted to be secured to the second male member 120 of the upper support. As such the second strap member 220 functions as the handle for the portable seat.

The present invention has many features which cannot be found on any similar equipment. It is easy to attach around a tree, is very comfortable, has a support for the back, and the seat can be swiveled to obtain a better view. The seat also folds up into a compact package for easy transport and storage.

The seat platform is secured to the tree with a nylon strap wrench which is ratcheted to obtain a very tight wrap that will not loosen. It is locked in position by pushing down on the handle and will not release until a quick release lever is pulled. The handle is then pulled up so the strap can be removed from the wrench mechanism.

Ball bearings are provided on the mount hat holds the seat on the platform so it can swing smoothly through an arc of about 340 degrees. The back support is 10 inches by 10 inches in size and extends up about the seat on a post which is hinged so it can fold down for easy transport and storage. A strap locks the seat and back together in the folded position when being carried.

The back face of the post is roughly textured for better gripping on the tree, and a carrying strap is attached. Foam padding makes the present invention more comfortable during the long vigils. This could be one of the most versatile, convenient, and easiest to erect seats ever devised.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved portable seat for use in the outdoors comprising, in combination:

an elongate lower support member having a first end, a second end, a top surface, and a bottom surface, an aperture formed through the second end of the lower support, a male member secured to the second end of the lower support member;

a triangular securement member having an upper portion, a lower portion, a base end and an apex end, the apex end of the securement member being integral with the first end of the lower support member, the upper portion of the securement member including a first leg and a second leg, a slot formed within the base end of the securement member, a first aperture formed within the first leg and a second aperture formed within the second leg;

an elongate upper support having a first end and a second end, a top surface and a bottom surface, a first male member secured to the upper surface, a second male member secured to the upper surface, a male member secured to the second end of the upper support;

a back rest having a first end, a second end, a top surface and a bottom surface, the top surface of the back rest secured to the second end bottom surface of upper support;

a connecting element having a first end, a second end, a top surface and a bottom surface, the second end of the connecting element being integral with the first end of the upper support, an aperture formed through the first end of the connecting element, the first end of the connecting element positioned in between the first and second legs of the triangular securement member, a pin positioned within the first aperture of the first leg, the aperture of the connecting element, and the aperture of the second leg, the pin functioning to pivotally secure the upper support to securement member;

a swiveling connection assembly, the assembly including a first plate member, the first plate member having a centrally located aperture, a top surface and a bottom surface, a second plate member, the second plate member having a centrally located aperture, a top surface and a bottom surface, a bolt secured through the centrally located aperture of the first plate member, the centrally located aperture of the second plate member, and the aperture of the lower support member, the bolt allowing for the first plate member to rotate relative to the second plate member;

a circular seat having a top surface and a bottom surface, the bottom surface of the seat being secured to the top surface of the first plate member, the swivelling connection assembly allowing the seat to rotate relative to the lower support member;

a strap having a first end and a second end and an intermediate extent therebetween, the intermediate extent of the strap extending through the slot of the securement member, the strap functioning to secure the portable seat to a tree;

a ratchet assembly having a first leg and a second leg, the first leg being pivotally secured to the second leg, the first end of the strap being secured to the first leg of the ratchet assembly, the second end of the strap being secured to the second leg of the ratchet assembly, the ratchet assembly functioning such that when the first leg is pivoted relative to the second leg a length of strap is wound within the second leg;

a first strap segment having a first end and a second end, an aperture formed within the first end, an aperture formed within the second end, the aperture of the first end adapted to be secured to the male member of the second end of the upper support, the aperture of the second end adapted to be secured to the male member of second end of the lower support; and a second strap segment having a first end and a second end, an aperture formed within the first end, an aperture formed within the second end, the aperture of the first end adapted to be secured to the first male member of the upper support, the aperture of the second end adapted to be secured to the second male member of the upper support, the second strap member functioning as a handle for the portable seat.

2. An improved portable seat for use in the outdoors comprising:

an elongate lower support member having a first end, a second end, a top surface, and a bottom surface;

a triangular securement member having an upper portion, a lower portion, a base end and an apex end, the apex end of the securement member being integral with the first end of the lower support member, the upper portion of the securement member including a first leg and a second leg, a slot formed within the base end of the securement member;

an elongate upper support having a first end and a second end, a top surface and a bottom surface;

a back rest having a first end, a second end, a top surface and a bottom surface, the top surface of the back rest secured to the second end bottom surface of upper support;

a connecting element having a first end, a second end, a top surface and a bottom surface, the second end of the connecting element being integral with the first end of the upper support, the first end of the connecting element pivotally connected in between the first and second legs of the triangular securement member;

a circular seat having a top surface and a bottom surface, the bottom surface of circular seat being rotatably connected to the top surface of the lower support; and a strap having a first end and a second end and an intermediate extent therebetween, the intermediate extent of the strap extending through the slot of the securement member, the strap functioning to secure the portable seat to a tree.

3. The portable seat as described in claim 2 further comprising:

a ratchet assembly having a first leg and a second leg, the first leg being pivotally secured to the second leg, the first end of the strap being secured to the first leg of the ratchet assembly, the second end of the strap being secured to the second leg of the ratchet assembly, the ratchet assembly functioning such that when the first leg is pivoted relative to the second leg a length of strap is wound within the second leg.

4. The portable seat as described in claim 2 further comprising:

a first strap segment having a first end and a second end, the first end adapted for securement to the second end of the upper support, and the second end adapted for securement to the second end of the lower support, the first strap segment function to secure the lower support to the upper support in the seats collapsed configuration; and a second strap segment having a first end and a second end the second strap segment secured to the upper surface of the upper support member, the second strap member serving as a carrying handle for the seat in its collapsed configuration.

* * * * *